Patented Jan. 1, 1935

1,985,993

UNITED STATES PATENT OFFICE

1,985,993

SYNTHETIC RESIN COMPOSITION AND PROCESS OF MAKING SAME

Willy O. Herrmann, Hans Deutsch, and Wolfram Haehnel, Munich, Germany, assignors, by mesne assignments, to Chemische Forschungsgesellschaft, m. b. H., Munich, Germany, a corporation of Germany No Drawing. Application May 31, 1929, Serial No. 367,608. In Germany June 26, 1928

20 Claims. (Cl. 106—22)

This invention relates to synthetic resin compositions and methods of making the same, and more particularly to synthetic aldehyde resins blended with other substances to give a satisfactory composition of matter for use in pressed or molded articles.

An object of this invention is to provide a synthetic aldehyde resin composition which has greater toughness, elasticity and resistance to fracture than the aldehyde resin compositions heretofore known. A further object is to provide an aldehyde composition which will readily absorb filling material such as kaolin to a much greater extent than previously known aldehyde resin compositions.

Synthetic resins prepared by the polymerization or condensation of aliphatic aldehydes combined with other materials or given special chemical treatments have been used in combination with fillers in making all sorts of pressed and molded articles. Such compositions of matter are materially cheaper than natural shellac which had previously been used, particularly in the manufacture of phonograph records. However, the substitution of these synthetic resins for shellac has been greatly retarded due to the fact that physical properties possessed by natural shellac are far more satisfactory for this purpose. Shellac has a much greater toughness, elasticity and fracture resistance than aldehyde resins and also, when melted, gives a liquid of much lower viscosity and is therefore able to absorb a greater quantity of filler.

We have now found a way of improving ordinary aldehyde resins, as well as the specially treated resins and those containing various additions, such as disclosed in United States Patents No. 1,489,213; No. 1,596,971; and No. 1,643,496 so that they are as satisfactory as natural shellac for making molded articles and considerably cheaper. These synthetic resins are, according to our process, combined with other polymer products. Among the polymer products which we have found suitable are the polymerized vinyl compounds such as polymerized vinyl esters, polymerized acrylic esters and polymerized itaconic acid esters and other similar film-forming polymers characterized by the presence of vinyl groups. Among the polymerized vinyl esters are named the polymerized vinyl acetates and especially the lower polymer grades thereof, which are soluble in benzene and alcohol. United States Patent No. 1,710,825 discloses a method of making these alcohol and benzene soluble grades of polymerized vinyl acetate.

The composition of matter resulting by the combination of these polymers with aldehyde resins has great toughness, elasticity and fracture resistance. Moreover, these compositions upon melting are free of bubbles, less viscous and have an even greater property of absorbing fillers than natural shellac. That this latter property is of great importance is shown by the efforts heretofore made to use aldehyde resins blended with natural shellac, which failed because there was no saving in cost due to the fact that the absorptive quality of the mixture for fillers was not large enough, so that a larger proportion of resins in the compositions was necessary. Experience soon demonstrated that the larger proportion of resins increased improportionally the cost of the material.

Our invention comprises combining a synthetic resin with these polymers in all proportions of weight. In most cases it is suitable to combine the aldehyde resin with 10 to 50 percent of its weight of these polymers. Castor oil can also be added to the mixture to improve the properties of the finished product. The castor oil if used should be present in percentages of 5 percent to 60 percent by weight of the synthetic resin. Although this invention is not concerned with the many specific fillers that may be used, we have found the following, as well as clay, are suitable: natural and artificial resins, kaolin, stone dust, magnesia, asbestos, lampblack, cotton flocks, wood meal, cork powder and the like.

The following specific examples are given to illustrate the invention:

Example I

A synthetic resin prepared according to United States application S. N. 458,610 by the continued condensation of aldehyde in the presence of an eight percent caustic soda lye at temperatures up to about 100° C. is melted with 50% of its weight of an alcohol soluble polymerized vinyl acetate prepared according to United States Patent No. 1,710,825 and is heated for 1 to 6 hours at about 110° C. The time for heating and the temperature may be varied according to the product to be obtained.

A product is thus obtained which has the elasticity, toughness and resistance to fracture of a natural shellac composition. Heated to 160 to 170° C. it gives a low viscosity, bubble-free melt which will take up as much as 300% of its weight of kaolin as a filler, whereas, natural shellac under the same conditions can only be mixed with 250% of its weight of kaolin.

It will be obvious that more limited amounts of alcohol soluble polymerized vinyl acetate could be used here to increase the elasticity and fracture resistance of the aldehyde resins and still give a product of greatly improved physical properties.

Example II

Ninety parts of a synthetic resin prepared according to United States Patent No. 1,643,496, by the continued condensation of aldehyde in the presence of a normal caustic soda solution, heating the formed resin up to 200° C., and melting it together with twenty parts of castor oil, are melted with ten parts of an alcohol soluble polymerized vinyl acetate. A product results having most favorable properties with respect to fracture resistance and absorption of filling materials. If desired this resin composition can be rolled out into a form resembling the commercial flake shellac.

When using alcohol or benzene soluble polymerized vinyl esters, the combination of these compounds with the synthetic resin can be carried out right in the process of making molded articles by the addition of the polymerized vinyl esters in a solution of alcohol to the mixture of aldehyde resin and filler.

It will be obvious that the use of the product obtained here, as well as those products obtained in the other specific examples, is not limited to the field of molded articles alone, but can be used for all other purposes where these improved properties are wholly or partially desired.

Example III

Ninety parts of a synthetic resin prepared according to United States Patent No. 1,596,971 by condensation of aldol in the presence of alkali is melted with ten parts of castor oil. Twenty parts of a 50% alcohol solution of polymerized vinyl acetate is run into this melt and the alcohol is distilled off under vacuum. The mixture is then heated to 180 to 200° C. thereby giving a product having a softening point of 85 to 90° C.

This product is particularly suited for making phonograph records, having to a remarkable degree the desired resistance to fracture.

Example IV

Eighty parts of a synthetic aldehyde resin obtained according to United States Patent No. 1,489,213, by condensation of crotonaldehyde and subsequent oxidation is melted with ten parts of castor oil and ten parts of polymerized vinyl butyrate. The resulting product possesses the same favorable properties as the polymerized vinyl acetate compositions.

Example V

Eighty-five parts of a synthetic aldehyde resin prepared according to United States application S. N. 458,610 by the continued condensation of butyl aldehyde in the presence of an eight percent caustic soda lye at temperatures up to about 100° C. is combined with fifteen parts of polymerized methyl acrylate by heating the mixture to a temperature of approximately 170° C.

This product has similar properties to the product described above.

Similar improved resin products may be obtained for instance by combining an aldehyde resin according to United States Patent No. 1,596,971 with ten parts of polymerized vinyl chloride or the same quantity of polymerized asymmetric dichlorethylene.

The invention claimed is.

1. A composition of matter resulting from combining a polymerized aldehyde resin free of vinyl ester and solid at ordinary temperatures and a polymerized product from the group consisting of vinyl acetate, vinyl butyrate, vinyl chloride, methyl acrylate, and asymmetric dichlorethylene.

2. A composition of matter resulting from combining a polymerized aldehyde resin free of vinyl ester and solid at ordinary temperatures and a polymerized fatty acid ester of vinyl alcohol.

3. A composition of matter resulting from combining a polymerized aldehyde resin free of vinyl ester and solid at ordinary temperatures and a polymerized vinyl acetate.

4. A composition of matter resulting from combining a polymerized aldehyde resin free of vinyl ester and solid at ordinary temperatures and an alcohol-soluble, benzene-soluble polymerized vinyl acetate.

5. A composition of matter resulting from combining a polymerized aldehyde resin free of vinyl ester and solid at ordinary temperatures and a polymerized vinyl acetate, the latter being from 10% to 50% by weight of the former.

6. A composition of matter resulting from combining a polymerized aldehyde resin free of vinyl ester and solid at ordinary temperatures, castor oil, and a polymerized vinyl acetate.

7. A composition of matter comprising a polymerized aldehyde resin free of vinyl ester and solid at ordinary temperatures, castor oil, a filler, and a polymerized vinyl acetate.

8. Method of making synthetic resin composition comprising combining a polymerized aldehyde resin free of vinyl ester and solid at ordinary temperatures with a polymerized product from the group consisting of vinyl acetate, vinyl butyrate, vinyl chloride, methyl acrylate, and asymmetric dichlorethylene at a temperature above the melting point of the aldehyde resin.

9. Method of making a synthetic resin composition comprising melting a polymerized aldehyde resin free of vinyl ester solid at ordinary temperatures and adding thereto a polymerized fatty acid ester of vinyl alcohol dissolved in a solvent.

10. Method of making a synthetic resin composition comprising melting a polymerized aldehyde resin free of vinyl ester and solid at ordinary temperatures and adding thereto a filling material and a polymerized product from the group consisting of vinyl acetate, vinyl butyrate, vinyl chloride, methyl acrylate, and asymmetric dichlorethylene.

11. Method of making synthetic resin composition comprising combining a polymerized aldehyde resin free of vinyl ester and solid at ordinary temperatures with a polymerized vinyl acetate at a temperature above the melting point of the aldehyde.

12. Method of making a synthetic resin composition comprising melting a polymerized aldehyde resin free of vinyl ester and solid at ordinary temperatures and adding thereto a polymerized vinyl acetate dissolved in alcohol.

13. Method of making a synthetic resin composition comprising melting a polymerized aldehyde resin free of vinyl ester and solid at ordinary temperatures and adding thereto castor oil and a polymerized fatty acid ester of vinyl alcohol.

14. Method of making a synthetic resin composition comprising melting a polymerized aldehyde resin free of vinyl ester and solid at ordinary temperatures together with castor oil and filler and adding to the mixture a polymerized fatty acid ester of vinyl alcohol.

15. A composition of matter comprising a polymerized aldehyde resin of a type which is free of vinyl ester and which is solid at ordinary temperatures, and polymerized methyl acrylate.

16. A composition of matter comprising a polymerized aldehyde resin of a type which is free of vinyl ester and which is solid at ordinary temperatures, and polymerized vinyl chloride.

17. Method of making a synthetic resin composition comprising combining a polymerized aldehyde resin of a type which is free of vinyl ester and which is solid at ordinary temperatures with polymerized methyl acrylate at a temperature above the melting point of the aldehyde resin.

18. Method of making a synthetic resin composition comprising combining a polymerized aldehyde resin of a type which is free of vinyl ester and which is solid at ordinary temperatures with polymerized vinyl chloride at a temperature above the melting point of the aldehyde resin.

19. Method of making a synthetic resin composition comprising melting a polymerized aldehyde resin of a type which is solid at ordinary temperatures and free of vinyl ester, and adding thereto castor oil and polymerized vinyl acetate.

20. Method of making a synthetic resin composition comprising melting together with castor oil and filler a polymerized aldehyde resin of a type which is solid at ordinary temperatures and free of vinyl ester, and adding to the mixture polymerized vinyl acetate.

WILLY O. HERRMANN.
HANS DEUTSCH.
WOLFRAM HAEHNEL.